United States Patent [19]

Rando et al.

[11] 4,062,634
[45] Dec. 13, 1977

[54] SYSTEM FOR CONTROLLING ATTITUDE OF LASER BEAM PLANE

[75] Inventors: Joseph F. Rando, Cupertino; Michael E. Kahn, Palo Alto; Thomas E. Heumann, Atherton; Scott S. Luebbers, Cupertino, all of Calif.

[73] Assignee: Spectra-Physics, Inc., Mountain View, Calif.

[21] Appl. No.: 548,608

[22] Filed: Feb. 10, 1975

[51] Int. Cl.² .............................................. G01B 11/26
[52] U.S. Cl. ..................................... 356/248; 356/149
[58] Field of Search .............. 356/149, 153, 248, 249, 356/250; 350/16; 33/374, 381–384

[56] References Cited

U.S. PATENT DOCUMENTS

| 621,358 | 3/1899 | Merrill | 33/381 |
|---|---|---|---|
| 3,588,249 | 6/1971 | Studebaker | 350/285 X |
| 3,612,700 | 10/1971 | Nelson | 350/16 UX |
| 3,729,266 | 4/1973 | Mason et al. | 356/250 |
| 3,876,309 | 4/1975 | Zicaro et al. | 356/153 |

*Primary Examiner*—John K. Corbin
*Assistant Examiner*—Matthew W. Koren
*Attorney, Agent, or Firm*—Flehr, Hohbach, Test, Albritton & Herbert

[57] ABSTRACT

A system is disclosed for controlling the plane of a laser beam in either horizontal, vertical or selected grade angle attitudes. The system includes an assembly comprising a housing which carries the operative components in a water-tight enclosure. The laser beam is generated by a laser tube carried on a chassis which is mounted for a limited range of universal movement about orthogonally intersecting Y and X axes by means of a gimbal frame. Optics structure is provided to route the beam in a collimated path along a Z-axis longitudinally of the chassis. A beam reflector unit rotatably mounted on an end of the chassis reflects the beam in a plane orthogonal to the Z-axis through a lighthouse structure provided in an end of the housing. The system for controlling the beam plane attitude includes three level sensing vials which are carried on the chassis, as well as a pair of Y- and X-axis motors and associated drive trains.

21 Claims, 17 Drawing Figures

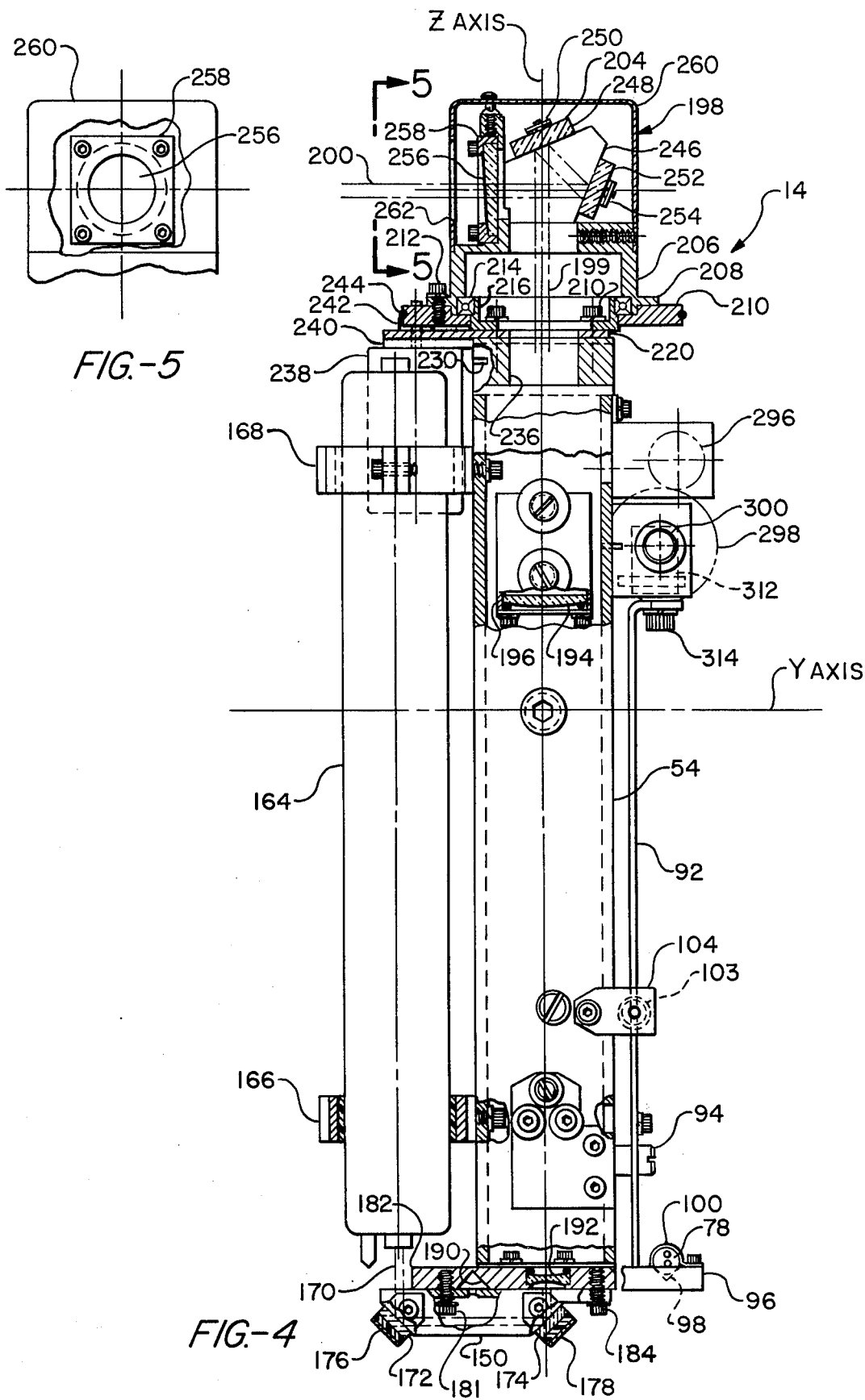

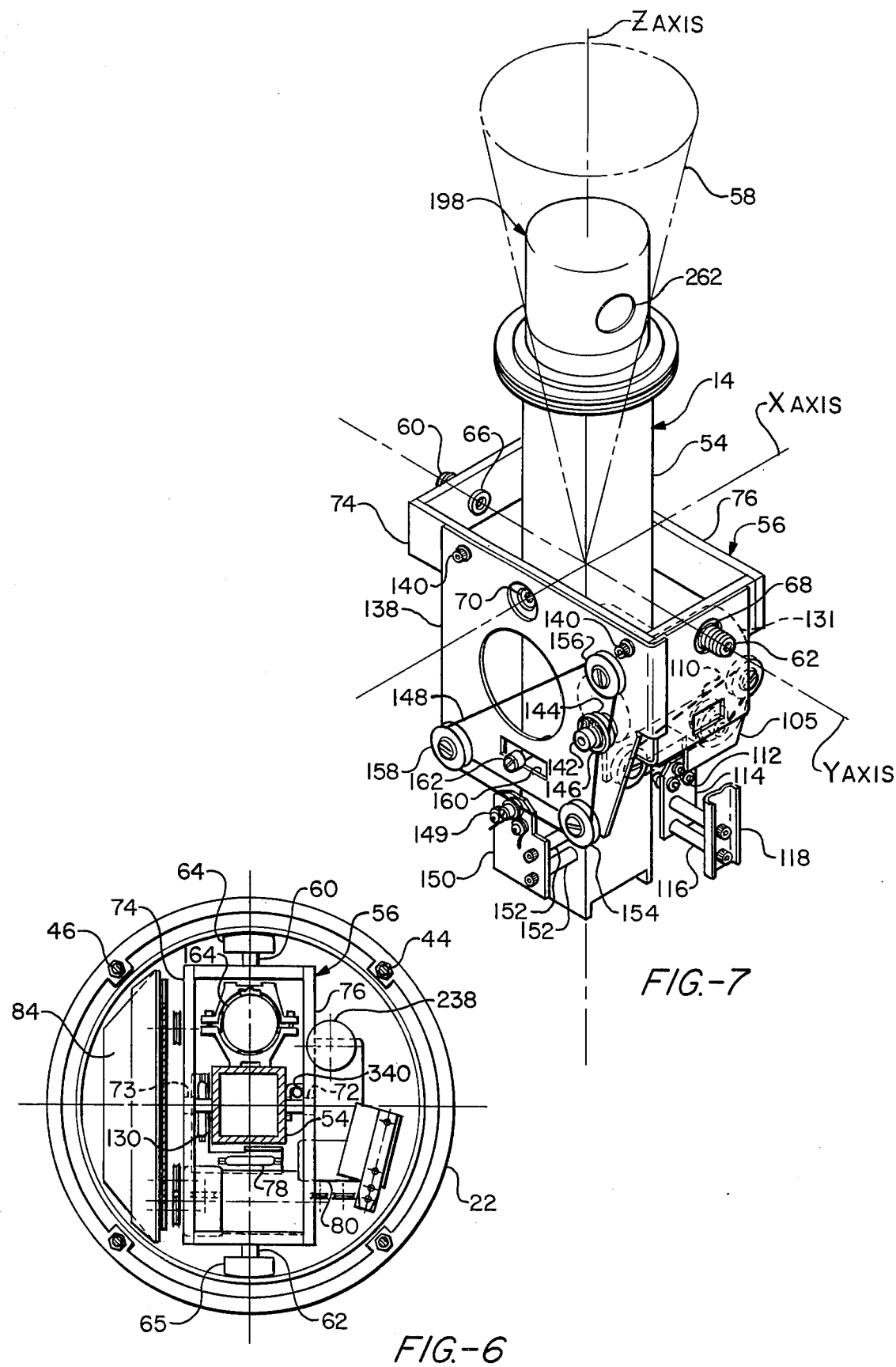

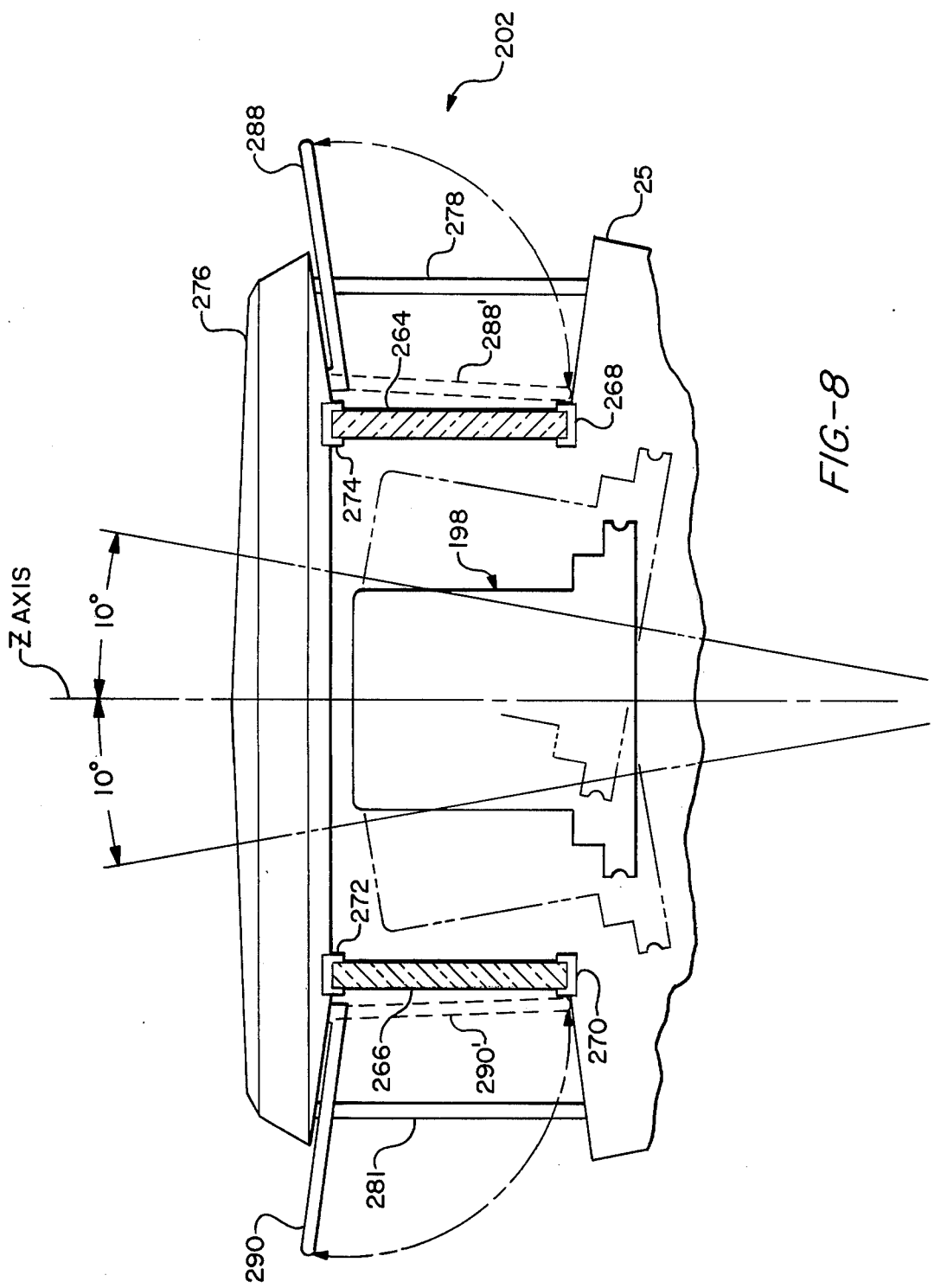

FIG.—13

SYSTEM FOR CONTROLLING ATTITUDE OF LASER BEAM PLANE

BACKGROUND OF THE INVENTION

This invention relates in general to systems for use in surveying and the construction industry. More particularly the invention relates to a system for projecting a laser beam in a plane having a selected horizontal, vertical or graded angle attitude.

Heretofore different instruments and procedures have been used in surveying and in the construction industry for measuring or checking elevations, grade, dimensions from off-set lines, and the like. It is well-known to use a level instrument to establish a line of sight on a leveling or grade rod. Such procedures involve a high labor content because they require two operators, one for controlling the level instrument and the other for handling the grade rod. Moreover, these procedures are subject to a number of inaccuracies and errors such as from design limitations in the instruments and from misreadings by the operators.

Laser beam systems have also been employed in surveying and construction industry systems of the type described. In one of these systems a laser beam projector is utilized in place of the level instrument. At the location whose elevation is to be measured or checked a target or laser beam detector is employed to intercept the laser beam. The laser beam projector employs a rotating head for sweeping the beam in a horizontal plane, with visually readable level vials and manually adjustable screws being provided for orienting the projector in a level attitude so that the beam plane is level. Such systems are available from Spectra-Physics, Inc. of Mountain View, California under the designation of Rotolite (TM) Laser Beam Projector. While such systems provide many improvements over the conventional level and rod systems, they also present certain disadvantages and limitations. For example, the degree of accuracy is establishing a horizontal beam plane is dependent on the operator's skill and judgement in reading the level vials as he operates the adjusting screws. Moreover, where the operator moves away from the device to tend the target or beam detector, the laser beam projector can move out of level adjustment, as from being jarred, without the operator's knowledge so that subsequent measurements would be erroneous. Such prior systems have also not provided the capability of precisely setting and maintaining the laser beam in a vertical plane or at a selected grade angle. Where it is desired to provide a rotating laser beam it has heretofore been infeasible to enclose all components within a completely water-tight enclosure to permit its use when exposed to the weather, e.g. in laying sewer pipe. Moreover at present where it is desired to point the laser beam along a selected axis the beam projecting head has been manually rotated. Heretofore it has not been feasible to incorporate the beam projector into a water-tight enclosure while maintaining the capability of beam pointing. In previous laser beam systems the components such as a laser tube, optics system and level vials have been attached onto the outer housing so that any shock forces imposed on the housing are carried through to the inner components with the result that the same are subjected to damage such that the system can lose its alignment. Thus there is a requirement for a new and improved laser beam projecting system for use in surveying and in the construction industry.

OBJECTS AND SUMMARY OF THE INVENTION

It is a general object of the invention to provide a new and improved system for use in measuring and checking elevations, grades, off-set dimensions and the like in surveying and in the construction industry.

A more particular object is to provide a system of the type described employing a laser beam which is projected in a plane which is precisely established and maintained at a pre-determined attitude. The laser beam plane can be established and maintained either horizontal, vertical or at any selected graded angle.

Another object is to provide a system of the type described in which a laser beam is automatically established and maintained in a selected horizontal, vertical or graded plane, and in which the attitude of such plane is maintained even if the instrument is subsequently jarred or moved from its original position.

Another object is to provide a system of the type described which provides a waterproof enclosure for a rotating laser beam projector and in which a control system is provided for establishing and maintaining the beam plane at a selected attitude.

Another object is to provide a system of the type described in which the components of the laser beam projector are mounted for self-leveling in a horizontal plane by a control system which operates through gimbal movement about a pair of coincident axes. The beam projector is further adapted for leveling about a third axis for maintaining a vertical beam plane attitude through a control circuit which incorporates a portion of the control system used for the horizontal or graded plane leveling.

Another object is to provide a system of the type described in which the components of the laser beam projector are carried on a chassis which is isolated from shock forces to minimize loss of alignment by means of a gimbal mounting arrangement.

Another object is to provide a system of the type described in which the laser beam projector is carried in a waterproof enclosure and in which a control system is provided for remotely controlling the beam pointing axis which projects through a sealed lighthouse. Controllable shutters are provided about the lighthouse for establishing the arc sectors through which the rotating beam projects for convenience and safety.

Another object is to provide a system of the type described employing a sealed enclosure having a transparent lighthouse through which the laser beam is projected in a rotating plane without distortion of the beam path even though the beam projector tilts relative to the lighthouse. The lighthouse incorporates flat transparent panes which are arranged in a manner to eliminate blind spots at a remote target or beam detector as the beam sweeps by the corners of the lighthouse.

Another object is to provide a system of the type described in which the laser beam projector incorporates reflecting mirrors which are oriented at precise angles on an integral carrier sub-assembly which in turn is rotatably mounted on a gimbaled chassis. A glass wedge is mounted in the sub-assembly for fine correction of the beam path.

The invention, in summary, includes a housing which sealably encloses a laser beam projector which is carried on a chassis. The chassis is carried on a gimbal frame for pivotal movement about an X-axis, and the gimbal frame in turn is carried on the housing for pivotal movement about a Y-axis. A laser tube mounted on a side of the chassis emits a downwardly directed beam which is routed through optics in a collimated path along a Z-axis longitudinally within the chassis. A beam reflector unit is rotatably mounted on the opposite end of the chassis for reflecting the beam in a plane orthogonal to the Z-axis. The rotating reflector unit includes a pair of reflector mirrors which are mounted at precise angles on an integral frame upon which a small angle prism or wedge is mounted for correcting the beam path. X- and Y-axes control means are provided for establishing and maintaining the beam path in either horizontal or graded planes. The control means includes level vials which are mounted for sensing movement of the chassis about respective X- and Y-axes, and X- and Y-axes drives respond to error signals from the vials to move the chassis and restore it to the selected orientation. The Y-axis vial is mounted on an arm for movement through a selected angle relative to the chassis whereby the beam plane is maintained at a graded angle from the horizontal equal to said selected angle. A third level vial is mounted on the chassis along the Z-axis when the housing is oriented horizontally, and the control system responds to error signals from the third level vial to control operation of the X-axis drive for maintaining the beam in a vertical plane.

The foregoing and additional objects and features of the invention will appear from the following description in which the preferred embodiments have been set forth in detail in conjunction with the accompanying drawings.

BRIEF DESCRIPTION OF THE DRAWINGS

FIG. 4 is a side elevational sectional view taken along the line 4—4 of FIG. 3;

FIG. 5 is a side elevational view, partially broken away, taken along the line 5—5 of FIG. 4;

FIG. 6 is a cross sectional view taken along the line 6—6 of FIG. 2;

FIG. 7 is a perspective schematic view of the laser beam projector and gimbal mounting arrangement of the apparatus of FIG. 1;

FIG. 8 is a fragmentary side elevation view of the lighthouse structure at the upper end of the housing of the apparatus of FIG. 1;

DESCRIPTION OF THE PREFERRED EMBODIMENTS

Figure 1:
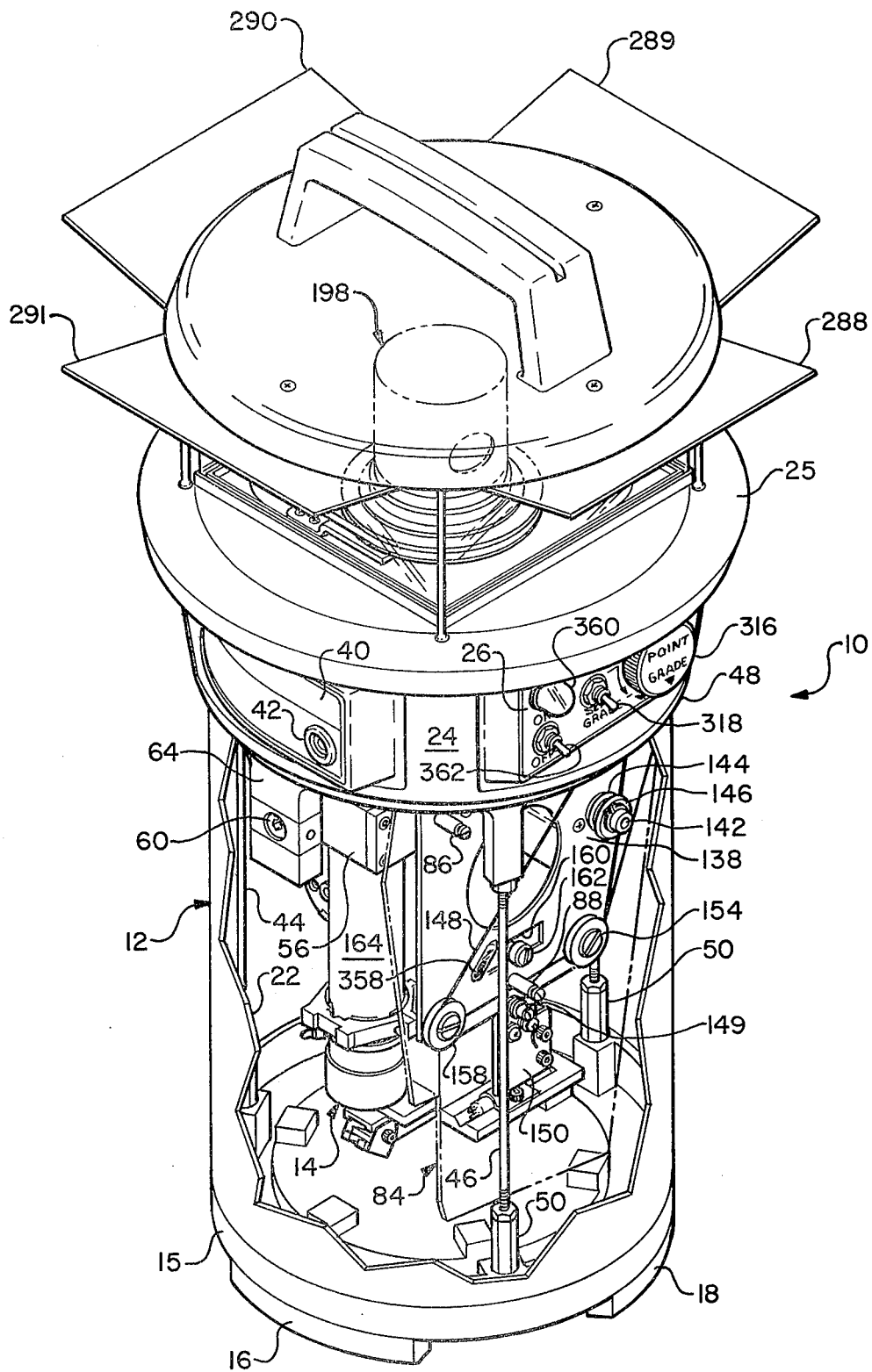
FIG. 1 is a perspective view of apparatus made in accordance with the invention shown with the printed circuit board removed from the chassis.

In the drawings FIG. 1 illustrates generally at 10 laser beam apparatus made in accordance with the present invention. Apparatus 10 is adapted for use in automatically establishing and maintaining a stationary or rotating laser beam in a plane which is selectively set in either a horizontal, vertical or graded angle orientation. While the invention will be described herein as used in surveying and in the construction industry for taking measurements such as elevations and the like, it will be understood the invention will find application broadly in other similar procedures which utilize a laser beam which is projected in a fixed plane.

Apparatus 10 includes a hollow cylindrical housing 12 which provides a sealed, water-tight enclosure for the internal components, which include a laser beam projector 14. Housing 12 comprises a circular base 15 having a plurality of annular pads 16, 18 which support the assembly on the ground or other surface in upright orientation for projecting a horizontal or graded beam plane. An annular, internally threaded trivet plate 20 is mounted by a circle of bolts concentrically within the base plate for attachment onto a suitable trivet or tripod, not shown, where it is desired to set the apparatus above the ground. An outer cylindrical shell 22 formed of a suitable material such as aluminum is mounted about base 15 from which it extends upwardly where it is joined with a housing casting 24. Housing casting 24 has a generally circular shell configuration terminating at its upper margin with a circular rim 25. The outer surface of the casting is squared off so as to define on one side a generally flat control panel 26 and on an adjacent side a flat window 28 for viewing a grade counter 292 to be subsequently described. Another side of the casting forms a flat surface 32 which mounts a receptacle 34 for receiving a plug from a power supply cable connected with a suitable power source, such as a 12 VDC battery, not shown. The surface 32 also mounts an amber indicator bulb 36 which is lighted by the control circuit to indicate a "Power On" condition, as well as a pair of receptacles 38 for receiving a suitable key, not shown, which is specially adapted to enable activation of the entire system. Another side of the housing casting is formed with a flat surface 40 mounting a circular bull's-eye type bubble vial 42 which is used in a manner to be described for purposes of orienting the laser beam in a vertical plane.

Housing casting 24, cylindrical shell 22 and base plate 15 are secured together by means of a plurality of elongate rods 44, 46 which are threadably connected at their upper ends with the lower rim 48 of the housing casting. Elongate nuts 50 are threadably mounted on the lower end of the rods, and a plurality of mounting bolts extend upwardly through openings 52 in the base plate for threading engagement with the elongate nuts. Suitable seals such as O-rings, not shown, are mounted within shell 22 between the housing and base plate for waterproofing the enclosure.

Laser beam projector 14 includes an elongate hollow chassis 54 which is mounted for rotation about an X-axis (FIG. 7) on a generally rectangularly shaped gimbal frame 56, and the gimbal frame in turn is mounted for rotation about a Y-axis with respect to housing 12. The X- and Y-axes are oriented orthogonal such that a Z-axis extending longitudinally of chassis 54 is adapted to undergo universal movement within a limited range of excursion, as depicted by the cone 58 shown in FIG. 7.

The Y-axis of rotation is defined by a pair of gimbal pivots which comprise set screws 60, 62 engaged through openings formed in ears 64, 65 which project downwardly from opposite sides of housing casting 24. The portions of the set screws which extend inwardly from the housing are unthreaded and are mounted in sleeve bearings 66, 68 formed of a suitable low friction material and which are carried in openings formed in opposite sides of the gimbal frame. The X-axis of rotation is defined by a pair of set screws 70, 72 which are threadably engaged through openings formed in opposite sides 74, 76 of the gimbal. The unthreaded inwardly projecting portions of the set screws are mounted in sleeve bearings formed of a suitable low friction material which are carried within openings formed through opposite sides of chassis 54. The X-and Y-axes are arranged to intersect at a point which is generally at the center of mass of the various components which comprise beam projector 14. As a result any torque forces imparted to the outer housing such as when the housing is hit or jarred are applied to the chassis as torque forces which are absorbed in the yieldable gimbal drive means which is to be described. Moreover, any shock force energy imparted to the housing tends to be absorbed as it travels through the series of elements interconnecting the chassis which the housing. The chassis and the components which it carries are thus somewhat isolated and protected from external shock loads and torque forces so that loss of alignment is minimized.

Chassis 54 comprises an elongate extrusion or tube of generally rectangular cross section which is centered about the Z-axis. X- and Y-axes control means are provided to move the chassis, and thereby the Z-axis, to a pre-determined orientation with respect to vertical planes which pass through the X- and Y-axes.

The Y-axis control means moves the gimbal frame 54 and thereby the chassis to a controlled orientation about the Y-azis. The Y-axis control means includes a Y-axis level vial 78, motor 80, drive train 82, and a servo control circuit forming a part of the main control circuit of FIG. 13. Components of the main control circuit are contained in printed circuit board 84 which is mounted on posts 86, 88 extending from a side of chassis 54, FIG. 2.

Y-axis level vial 78 comprises an elongated arcuate hollow glass vial containing a suitable level seeking fluid and bubble as well as spaced electrodes 90 which are connected with the control circuit to generate error signals responsive to movement of the bubble within the vial as the latter is moved about the Y-axis. The vial is mounted at the lower end of an arm 92 which is pivotally mounted on a lower portion of the chassis by a set screw 94 for movement in a plane orthogonal to the Y-axis. The Y-axis vial is positioned in an upwardly convex orientation lying transversely of the arm so that the bubble moves to a centered position when the vial is oriented horizontally. The vial is positioned with respect to arm 92 by means of a plate 96 which is secured to the lower end of the arm. This plate is accurately machined with a V-shaped groove 98 into which the vial is precisely set by means of a clamp 100. Arm 92 is pivoted about set screw 94 by means of a grade setting control and drive train 102 which is controllable by knob 34 for selectively setting the projected laser beam in either a horizontal or graded plane, as will be described. The arm 92 is pivotally biased by means of a spring 103 mounted to the chassis by a bracket 104 to eliminate backlash in the gears of the drive train 102.

Y-axis motor 80 is mounted on a bracket 105 which in turn is secured to an end of gimbal frame 56. The motor drive shaft 106 carries a slip clutch device 107 and drive pulley 108 which driveably engages drive train 82 which includes a flexible cable 110. One end of the cable is fixedly attached by screws 112 to a tie plate 114 (FIG. 7) which in turn is mounted on a pair of posts 116 to an arm 118 which is fixedly attached to and extends downwardly from housing ear 65. Cable 110 extends from one side of the tie plate and is wrapped a number of turns around drive pulley 108 from which it extends toward and is reeved around an idler pulley 120 and around another idler pulley 122, both of which are mounted on bracket 105. The cable end then extends from pulley 122 and is fixedly attached to screws 112 on the tie plate. Drive pulley 108 is mounted for rotation about the drive shaft. The slip clutch device 107 comprises a suitable axial thrust force member, preferably a Belleville washer, which is mounted in frictional engagement between the outer end of the drive pulley and a C-clamp 124 which is mounted within a groove formed at the end of the drive shaft. The Belleville washer provides a predetermined axial thrust force between the end of the pulley and C-clamp to create sufficient frictional drag which will turn the pulley with the drive shaft under operating loads encountered when the chassis is pivoting about the Y-axis between its limits of travel. These limits of travel are defined by an elongate opening 126 formed in bracket 105 into which there extends a stop member or post 128 which is mounted on housing arm 118. As the chassis and gimbal frame pivot about the Y-axis bracket 105 is carried to a point at which the ends of opening 126 abut the stop post to thereby limit the range of travel about the Y-axis. When the stop posts is thereby engaged the momentum of the moving components creates a larger force through the cable to drive pulley 108 which is sufficient to overcome the frictional drag of clutch 107 so that the drive pulley can slip relative to the drive shaft, thereby reducing shock loading on the drive and chassis components.

The X-axis control means moves the chassis and thereby the Z-axis to a controlled orientation about the X-axis. This control means includes an X-axis level vial 130, motor 131, drive train 132 and a servo control circuit forming a part of the main control circuit. The vial 130 is mounted on an integral extension 133 of the plate 96 which is carried by arm 92, with the extension projecting around an adjacent side of chassis 54. The vial 130 is mounted for movement with arm 92 to eliminate cross axis insensitivity of the X-axis vial when the chassis is moved through an angle from the arm for generating a graded plane. Level vial 130 comprises an elongate arcuate hollow glass vial containing a suitable level seeking fluid and bubble as well as spaced electrodes which are a part of the control circuit. Level vial 130 is oriented within a plane orthogonal to the X-axis and is mounted in an upwardly convex position at a 90° orientation from the Y-axis vial. The bubble seeks a centered position within the vial when the extension 133 is horizontal. This extension is accurately machined with a V-shaped groove 134 into which the vial is precisely set by means of a clamp 136. Movement of the fluid within the vial as the chassis and thereby the Z- axis pivot about the X-axis generates an error signal in the control circuit for operating X-axis motor 131.

X-axis motor 131 is mounted on the inner side of a bracket 138, FIG. 1, which in turn is mounted by bolts 140 on gimbal frame 56. Drive shaft 142 from the motor extends through an opening formed in this bracket. A drive pulley 144 and slip clutch device 146 are carried on the end of the drive shaft. The drive train 132 includes a flexible cable 148 which is fixedly attached at one end by screws 149 to a tie plate 150 which in turn is mounted by posts 152 to the lower end of the chassis. The cable extends horizontally from the tie plate and is reeved about and extends upwardly from an idler pulley 154 and then is wound a number of turns about drive pulley 144. The cable continues upwardly and is reeved around a second idler pulley 156 from which it inclines downwardly toward and is reeved around a third idler pulley 158. The cable then runs back and is attached to the tie plate. An elongate slot 160 is formed in bracket 138 and a post 162 which is mounted on a side of the chassis projects through this slot to provide a stop for limiting the range of pivotal movement of the chassis about the X-axis. Reversible operation of motor 131 under influence of the servo control system causes relative movement between the pulleys and fixed portion of cable 148 so that the chassis is pivoted back and forth about the X-axis.

Slip clutch device 146 is similar in operation to the Y-axis clutch device and comprises a suitable axial thrust force member such as a Belleville washer mounted between the end of the drive pulley and a C-clamp which mounted in a groove in the end of the drive shaft. Between the limits of travel of the chassis the thrust force from the Belleville washer turns the drive pulley with the drive shaft, and when the chassis moves to either stop position against post 162 then the frictional drag is overcome by the drive pulley. The frictional drag in the clip clutch assists in isolating the chassis from shock forces by slipping and absorbing energy when the stops are hit and when torque forces are applied to the housing having a component about the X-axis.

The laser beam is generated by a laser tube 164 which is mounted by means of suitable clam-shell type clamps 166, 168 on a side of chassis 54. Preferably the laser tube contains a suitable active gas such as a helium-neon gas which produces a low-powered collimated output beam in the red band of the light spectrum. The output beam 170 from the tube is directed in a direction downwardly parallel with the Z-axis.

Optics means is provided for routing the laser output beam, and the optics means includes a pair of mirrors 172, 174 mounted by brackets 176, 178 onto a channel 180. The channel is adjustable for precisely aligning the beam in a direction upwardly within the chassis along the Z-axis. The mirror 172 is mounted at a 45° orientation in register with output beam 170 from the laser tube for reflecting the beam lengthwise of the channel. The mirror 174 is mounted on an opposite end of the channel at a 45° angle to again reflect the beam upwardly along the Z-axis. The channel 180 is mounted to a plate 182 by means of hold down screws 184, 186 which extend through openings in the channel base of a greater diameter than the shanks of the screws. An opening 188 is formed through the channel base with a conical countersink portion and this opening is aligned with a conical countersink 190 formed in the lower side of plate 182. A suitable pointed tool can be inserted through opening 188 and into engagement with countersink 190 for fine adjustment of the channel relative to plate 182, with the hold down screws being turned down to lock the channel in an accurate position. A suitable diverging lens 192 is mounted within an opening formed in plate 182 and the lens is aligned with the Z-axis for diverging the laser beam to the desired diameter. A suitable collimating lens 194 is mounted to a bracket 196 secured by suitable means on the inside of the chassis for collimating the beam in a direction along the Z-axis.

The collimated beam passes upwardly in a path 199 through the open end of the chassis into a pentaprism reflecting head 198 which projects the beam outwardly along the path 200 through a lighthouse structure 202 (FIG. 8) in a plane orthogonal to the Z-axis. Reflecting head 198 comprises a pentaprism assembly 204 mounted on a platform 206 which in turn is mounted for rotation about the Z-axis. The platform 206 is formed at its lower end with a flange 208 which is mounted above a driven pulley 210 by a circle of bolts 212. The outer race of a ball bearing assembly 214 is concentrically mounted within platform 206, and the inner race of the bearing is mounted on an annular bearing mount 216.

Figure 2:
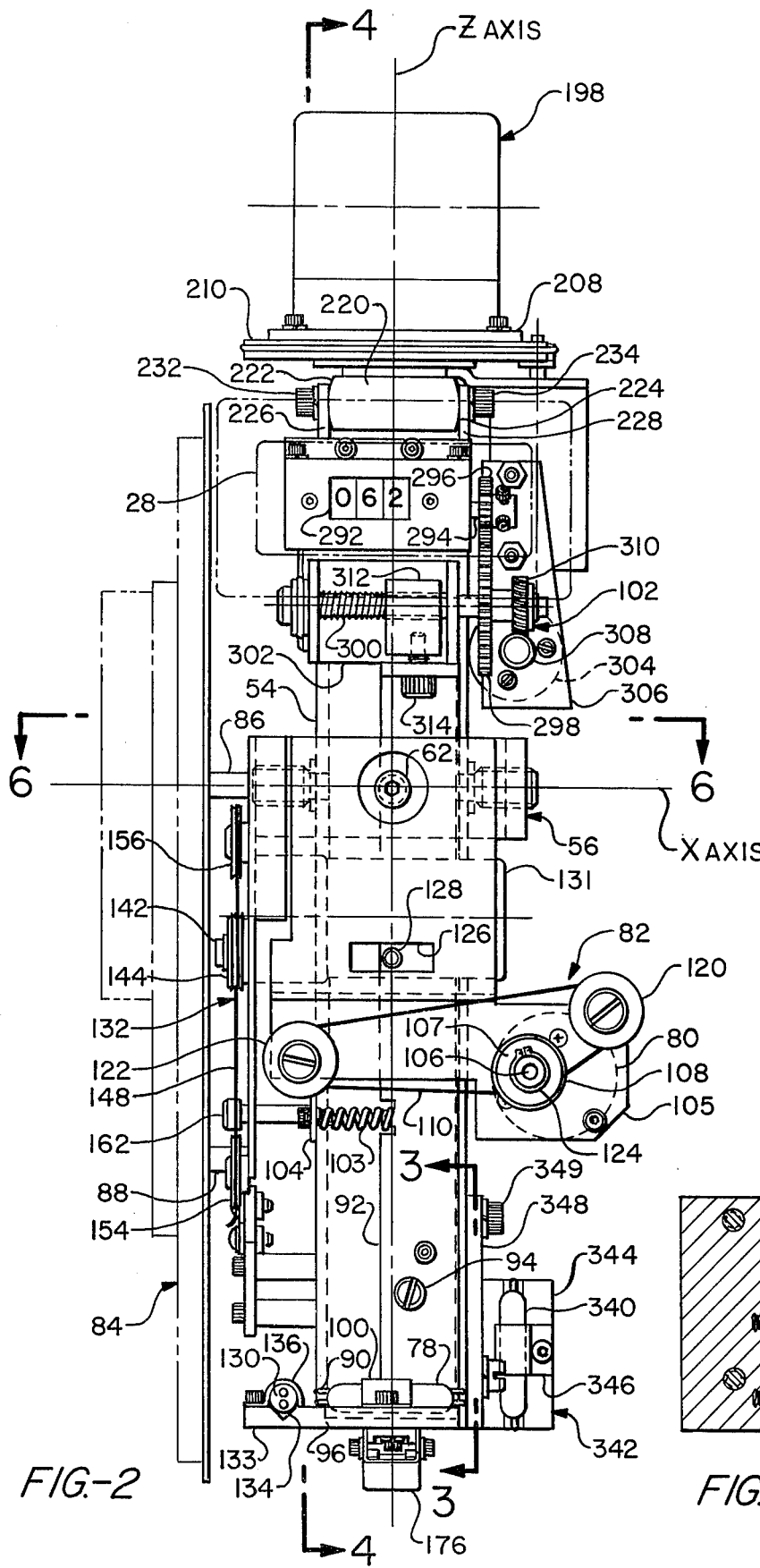
FIG. 2 is an elevational view of one side of the chassis of the apparatus of FIG. 1.
Figure 3:
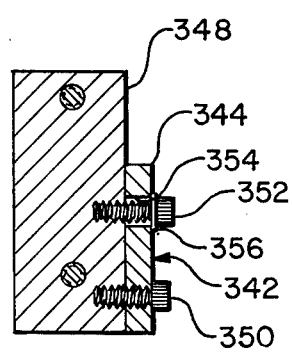
FIG. 3 is a sectional view taken along the line 3—3 of FIG. 2.

Bearing mount 216 is mounted by a circle of bolts 218 to a pentaprism adjusting block 220, best shown in FIG. 2. Adjusting block 220 is elongate in a direction transverse of the chassis, and opposite sides of the block are formed with an outwardly convex pair of cylindrical surfaces 222, 224 aligned longitudinally of the block. The inwardly facing walls 226, 228 of the chassis are formed with inwardly concave cylindrical surfaces which seat respective curved surfaces of the block such that the block is adapted to be adjustably rotated about its longitudinal axis relative to the chassis. An adjusting slot 230 is formed in the chassis wall 226 in alignment with a countersink hole formed in the underlying surface of the adjusting block. A suitable sharp adjusting tool can be inserted through the slot and into the underlying coutersink hole for obtaining positional adjustment of the block with respect to the chassis, and this in turn provides for fine positional adjustment of pentaprism assembly 204 to obtain precise alignment of the projected laser beam. Set screws 232, 234 are mounted in openings formed through the walls of the chassis and these set screws are turned down for locking the block in position when fine adjustment has been achieved. A central opening 236 is formed through the block for passing the laser beam upwardly into the pentraprism assembly.

The pentaprism assembly 204 is rotated by means of a motor 238 which is mounted on a bracket 240 secured to a side of the chassis. The drive shaft of the motor extends upwardly where it is keyed to a drive pulley 242. A suitable flexible endless belt such as the O-ring 244 is reeved about a groove formed in the drive pulley and a groove formed in driven pulley 210 which in turn rotates the pentaprism platform 206.

Pentaprism assembly 204 comprises a pair of reflecting surfaces which are accurately aligned for routing the beam outwardly in a plane orthogonal to the Z-axis. The assembly 204 includes an integral frame 246 which is mounted above platform 206. This frame is formed with a pair of upstanding sidewalls which are precisely machined to form a first inclined surface which mounts a mirror 248 by a clamp 250, and a second inclined surface which mounts a mirror 252 by a clamp 254. The inclined surfaces of the frame are precisely machined so that the beam is first reflected from mirror 240 at a 45° included angle between the incident and reflected beams and then is similarly reflected from the mirror 252 at a 45° included angle so that the beam emerges from the pentaprism at 90° from the Z-axis. Because of the allowable tolerances inherent in machining and mounting the pentaprism mirrors it has been found that a fine adjustment of the beam path is required to bring it into a plane orthogonal to the Z-axis within a few seconds of arc. To obtain this fine adjustment a circular prism 256 is mounted for selective rotation in a plane generally orthogonal to the path of beam 200. The prism is carried by a collar 258 which in turn is mounted on pentaprism frame 246. The prism is formed with its outer surfaces having a relatively small included angle, preferably in the range of 10 to 20 minutes of arc. A beam passing through the prism will thereby be refracted through a small angle. To obtain fine adjustment of the output beam orientation, the prism is located about its center until any vertical misalignment of the beam from the pentaprism mirror system is compensated for by refracting the beam path into a plane which is precisely orthogonal to the Z-axis. Any minor horizontal misalignment of the beam can be tolerated and does not result in errors at the target. A cup-shaped shroud 260 is mounted above frame 206 so as to enclose the pentaprism assembly. A circular aperture 262 is formed in the side of the shroud aligned with the emitted output beam.

Figure 9:
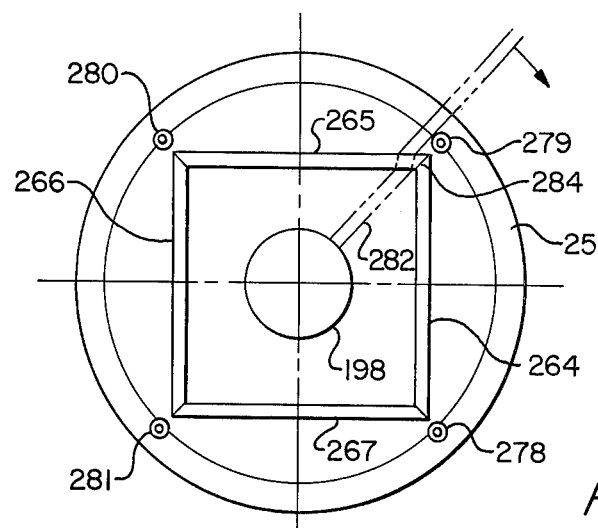
FIG. 9 is a schematic cross sectional view taken along the line 9—9 of FIG. 8 illustrating one operative sequence of the lighthouse structure.
Figure 10:
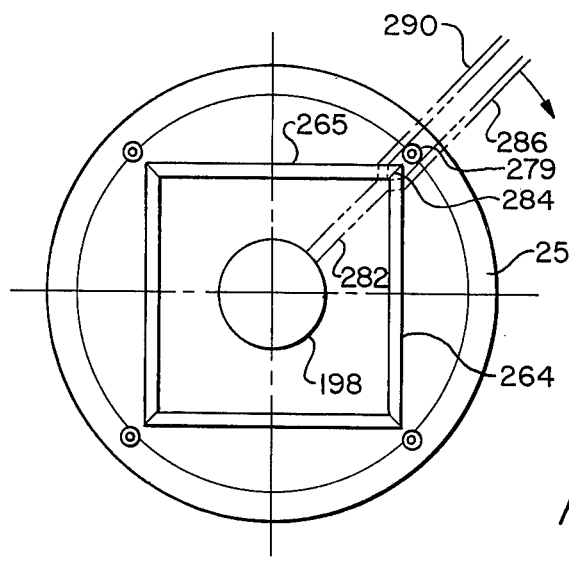
FIG. 10 is a view similar to FIG. 9 illustrating another operative sequence of the lighthouse structure.
Figure 11:
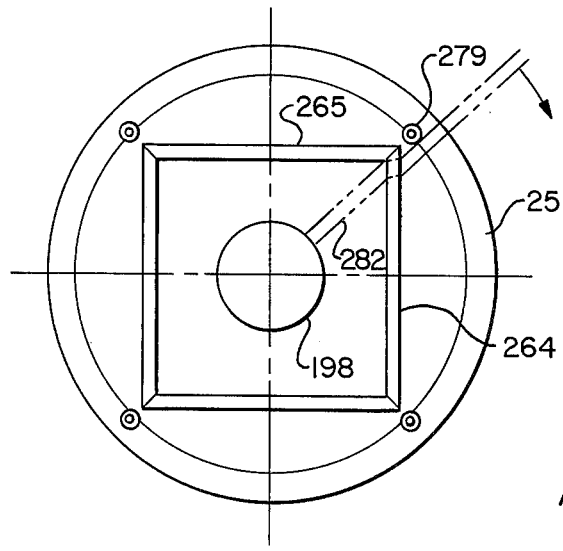
FIG. 11 is a view similar to FIG. 9 illustrating another operative sequence of the lighthouse structure.

Lighthouse assembly 202 in the upper end of housing 12 provides a water-tight enclosure for the rotating and tiltable pentaprism reflector head 198 while at the same time providing a transparent window for transmitting the beam without introducing undesirable beam distortion. The lighthouse assembly includes a plurality of upstanding transparent panes 264-267 which are joined together at their side edges so as to form a polygonal cross sectional configuration. In the illustrated embodiment four such panes are provided to form a square in cross section. Preferably the panes comprise flat optical quality glass which have on their inner and outer surfaces a suitable anti-reflective coating. The lower edges of the panes are sealably mounted by gaskets 268, 270 within recessed seats formed in the upper rim 25 of the housing, and the upper edges of the panes are sealably mounted by gaskets 272, 274 within recessed seats formed within top casting 276. Four elongate posts 278-281 are threadably mounted between the top casting and housing for applying axial thrust forces which pull the top casting and housing together and lock the panes into their seats. As shown in FIGS. 9-11 the four posts are aligned radially outwardly of the corner junctures between the panes. The panes are formed with 45° bevel surfaces at their interfaces which are sealably mounted together by a suitable adhesive.

The configuration and positioning of the panes at their junctures with respect to the posts provides a novel arrangement for sweeping the beam past each post position throughout a full 360° without loss of impingement, i.e., a blind spot, upon the remote target or beam detector. The schematic diagrams of FIGS. 9-11 illustrate the path of a beam 282 as it sweeps clockwise, as viewed from above, past the position of the corner post 279 at the interface 284 between the panes 264 and 265. In this explanation it will be assumed that apparatus 10 is set up to project a horizontal plane. In FIG. 9 the beam is at a position just prior to intersecting the interface. The beam is refracted outwardly through an angle, in a horizontal plane, at the inner surface of pane 265, and then is refracted back at an equal angle as it emerges from the outer surface of the pane. The leading portion of the beam which would otherwise be blocked by the post is instead refracted in a path which avoids the post so that the full beam can impinge upon the remote target.

FIG. 10 illustrates the position of beam 282 at which it is in radial register with post 279 and pane interface 284. In this case the leading one half portion 286 of the beam is refracted forwardly through a horizontal angle at the inner surface of pane 264 and then is refracted back through an equal angle as it emerges from the outer surface so that this beam portion is refracted through a path which avoids the post and thereby can fully impinge upon the target. In the same beam position the trailing beam portion 290 is refracted back through a horizontal angle at the inner surface of pane 265 and then forward at an equal angle as it emerges from the outer surface. Thus this trailing portion also avoids the post and can fully impinge upon the target.

FIG. 11 illustrates a further beam position immediately after the pane interrace whereby the full beam is refraced through pane 264 to completely avoid the post. It will be realized that, when the beam moves across the interface of the panes within the lighthouse, such beam will be observed at the target as a split beam, the leading portion of which progessively enlarges in size as it sweeps forward while the trailing portion progessively decreases in size. However, the total area of beam impingement is substantially the same as if the beam were not sweeping by the post.

Four shutters 288-291 are hingeably mounted at their upper ends to top casting 279 across the upper edges of respective panes 264-267. The shutters are individually manually pivoted between an upper position for uncovering the panes, and a lower position 288', 290' for covering the panes. With selected panes covered a rotating beam can be projected through selected arcs, as desired.

Means is provided for selectively setting the laser beam plane at a desired grade angle, and this means includes a grade setting indicator 292 (FIG. 2) having a plurality of digital marked dials which are turned from a input shaft 294 by the grade setting control and drive train 102. Indicator 292 is mounted on the upper end of chassis 54 at a position adjacent window 28 formed in the side of casting 24 to permit external observation of the grade setting which is displayed by the indicator. A gear 296 is keyed for rotation with shaft 294 and is in driving engagement with a gear 298 mounted on a lead screw 300. The lead screw is rotatably mounted across a frame 302 secured to a side of the chassis. The gear and lead screw are driven by means of a suitable reversible electric grade setting motor 304 mounted on a bracket 306 secured to the chassis. The output shaft from motor 304 drives a worm gear 308 engaging a worm wheel 310 which in turn is keyed for rotation with lead screw 300. The lead screw threadably engages a nut 312 which is constrained for movement back and forth along the length of frame 302. Linear movement of the nut 312 is translated into pivotal movement of arm 92 through a yielding connection which comprises a set screw 314 threadably engaged in an opening formed in the lower side of the nut. The upper end of arm 92 is turned outwardly and is formed with an opening through which the set screw projects.

Grade setting motor 304 is operated by the control circuit responsive to manipulation of a grade knob 316 on control panel 26 to that the selected grade angle can be controlled from outside of the water-tight housing. A toggle switch 318 on the control panel is turned downwardly to the "Set Grade" position and the knob 316 is then turned in either direction to supply a directional signal to the grade setting motor. Operation of the motor advances or retracts the reading on indicator 292, depending upon the direction in which the grade knob is turned to reach the selected grade angle, at which point the knob is turned back to its centered position. Simultaneously the nut 312 is moved to pivot arm 92 about screw 94 to an angle relative to the Z-axis which is equal to the selected grade angle. Y-axis level vial 78 is at the same time moved through the same angle relative to the Z-axis. As the Y-axis level valve pivots from its level orientation it generates an error signal such that the Y-axis control system operates Y-axis motor 80 to pivot the chassis about the Y-axis in a direction which will restore vial 78 to its level orientation. As the chassis moves, arm 92 and vial 78 move with it until the vial again reaches its level orientation. At such point the Z-axis will then be inclined at an angle, equal to the selected graded angle, from a vertical plane passing through the Y-axis. At the same time the plane of the laser beam will be at an angle from a horizontal plane equal to the selected graded angle.

Figure 12:
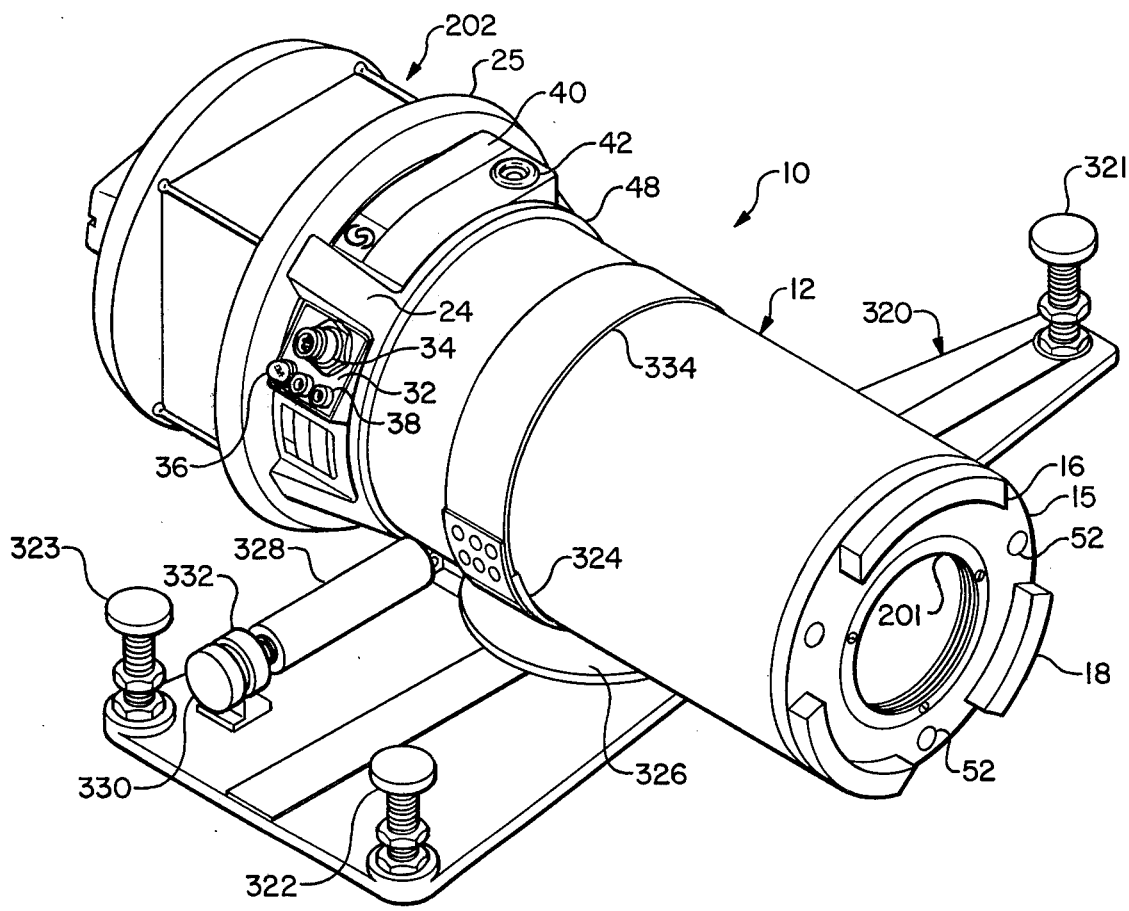
FIG. 12 is a perspective view of the apparatus of FIG. 1 shown in use with a base plate for generating a vertical beam plane.

FIG. 12 illustrates the use of apparatus 10 for projecting a beam in a vertical plane. For this purpose a base plate 320 is provided, and the base plate comprises a generally triangular flat plate which is supported above the ground or other surface by means of three vertically extending threaded adjustment screws 321–323. A C-shaped saddle 324 is mounted on the base plate for rotation about a vertical axis by means of a support ring 326. An adjustment cylinder 328 is mounted at its one end to an arm extending radially from the support ring. A threaded screw 330 is rotatably mounted at its head end on a collar 332 which in turn is mounted on the base plate. The screw 330 extends into threading enegagement within the cylinder so that rotation of the screw in either direction extends and retracts the cylinder to pivot the saddle and apparatus 10 about a vertical axis. Housing 12 is locked onto the saddle by means of a flexible strap 334. The housing is oriented in the saddle with bull's-eye level vial 42 facing generally upwardly, and this serves to coarsely position both the Z-axis and X-axis in a plane which is horizontal. A finer adjustment is accomplishment by selectively turning the adjusting screws 321–323 up or down to move the corners of the base plate until the bubble within vial 42 is viewed as being centered on the bull's-eye. It is desirable to orient the X-axis generally horizontal so as to minimize cross axis insensitivity of the Z-axis level vial 340 shown in FIG. 2.

The emitted laser beam is brought into precise adjustment to a vertical plane through operation of the Z-axis level vial 340. This vial is mounted on an adjusting plate assembly 342 which in turn is mounted on the lower end of chassis 54. The level vial 340 comprises an elongate arcuate hollow glass vial which encloses a suitable level seeking fluid and bubble. Suitable electrodes are mounted in the vial and are coupled in the control circuit for generating Z-axis error signals.

Adjusting plate assembly 342 includes a steel block 344 formed with a V-shaped groove which is ground so as to maintain precise registration between the vial and steel block. A spring metal clip 346 is mounted on the block to hold the vial within the groove. The steel block has substantially the same coefficient of thermal expansion as the glass vial so that under thermal excursion due to temperaure changes there is little relative motion between the glass steel parts. Steel block 344 is mounted on the side of an aluminum mounting plate 348 by means of a sliding joint connection, and the plate in turn is secured by set screws 349 to the lower end of the chassis, which is also aluminum. The sliding joint connection between the block and plate 348 comprises a fixed set screw 350 which is threadably mounted through aligned openings formed in the lower end of the block and mounting plate, together with a shoulder screw 352 which is mounted through an over-sized opening 354 in the opposite end of the steel block and is threadably engaged with an opening formed in the side of plate 348. A belleville washer 356 is provided under the head of screw 352 to maintain surface contact between the block and plate. During temperature changes the differential change in size between the block and plate is accommodated for by relative movement along the mating surfaces and by the relative movement between the shoulder screw and upper opening of the block. The assembly thereby accommodates for temperature changes without introducing any undesirable variables due to a change in the angle of the level vial relative to the chassis, thereby increasing the accuracy of the leveling system.

The control circuit includes a mercury switch 358 mounted for movement with the chassis at a 45° orientation when the housing is upright, as shown in FIG. 1. In the upright position the mercury seeks a lowermost position within the switch and closes electrode contacts which activate the X- and Y-axes control system. When the housing is moved to a horizontal orientation as in FIG. 12 for generating a vertical plane, the mercury switch is turned through 90° so that the contained mercury closes additional electrode contacts which are connected in the control circuit to inactivate the X-axis level vial and Y-axis control means and activate the circuit connected with Z-axis level vial 340. Error signals from the Z-axis level vial activate X-axis motor 131 for controlling pivotal movement of the chassis about the X-axis to orient the Z-axis in a horizontal plane.

Figure 13:
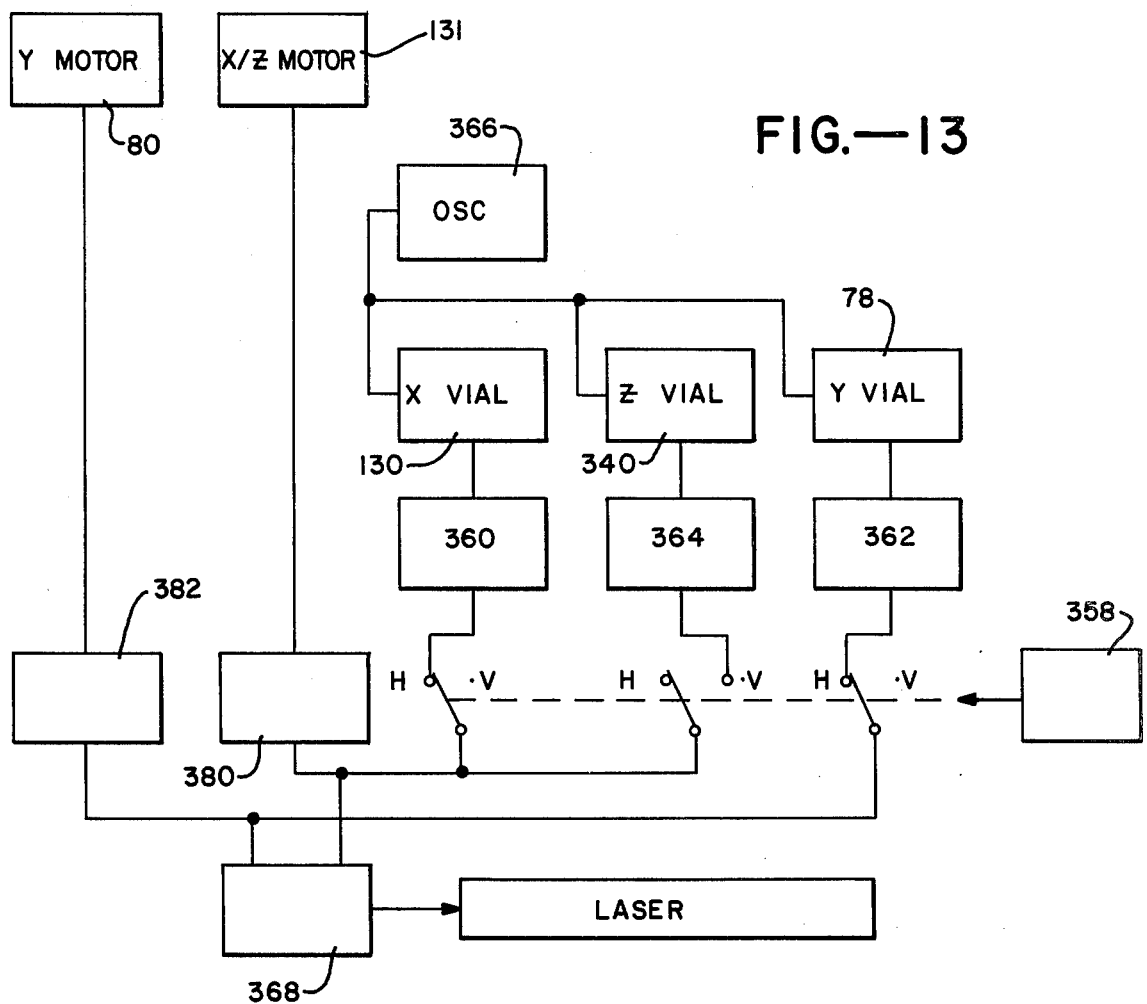
FIG. 13 is a block diagram illustrating the control circuit of the apparatus of FIG. 1.

Referring now generally to FIGS. 13 through 17, but with particular reference to FIG. 13, the interconnection of the various control circuits together with the motors is shown in general form. Thus, mercury switch 358 serves to interconnect error sensing circuits for each of the axes in an appropriate connection with the respective Y motor 80 and X, Z motor 131. As shown, the leftmost position of the switch is utilized for horizontal operation and interconnects the X vial with the X motor, and the Y vial with the Y motor through appropriate circuitry. In the other position in which a vertical beam is being developed, the switch disconnects the X vial from the circuit, connects the Z vial 340 to the X, Z motor 131 and disconnects the Y vial circuitry.

Figure 14:
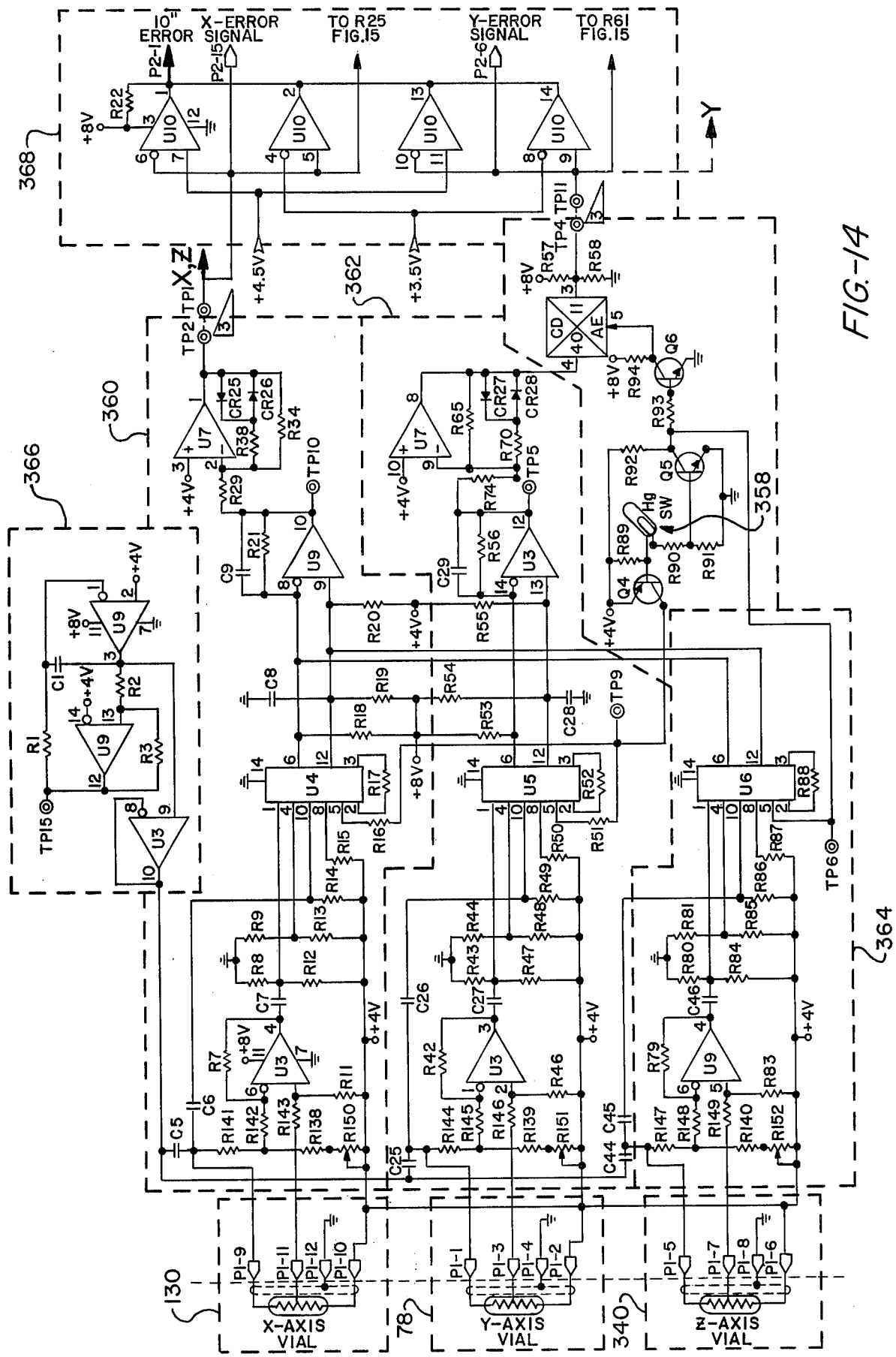
FIGS. 14 and 15 are detailed schematic diagrams of the electronic control circuits of FIG. 13.
Figure 15:
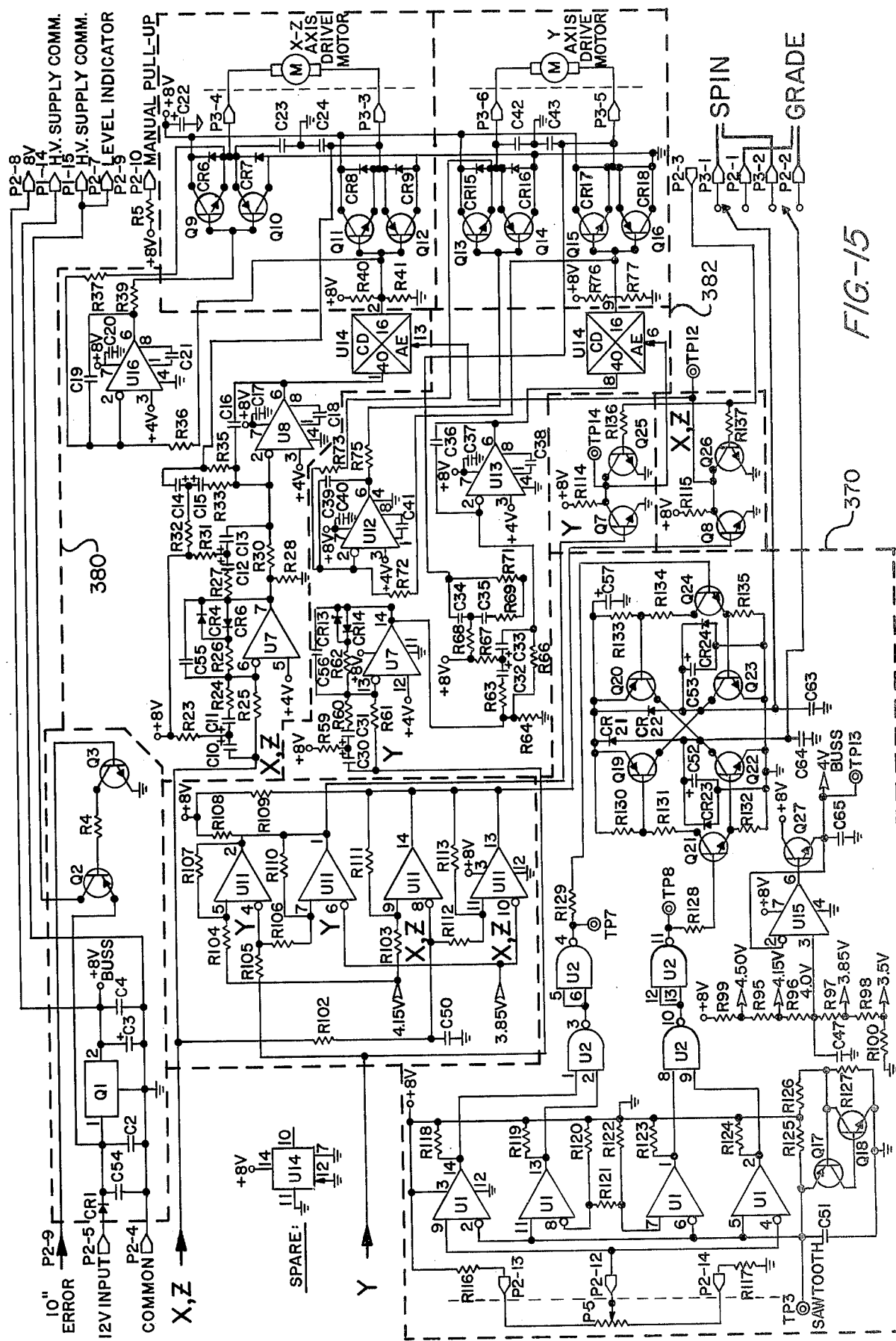

Referring now more specifically to FIGS. 14 and 15, the circuitry for controlling the attitude of the instrument of the present invention is shown in detail. Thus, X-axis, Y-axis and Z-axis level vials 130, 78, and 340 are connected to respective X, Y, and Z error sensing circuits 360, 362 and 364. Each of the level vials forms part of an AC bridge circuit, the AC signal being supplied from oscillator 366. The oscillator is a triangle wave oscillator having an output taken from pin 10 of U-3 which has served as a buffer stage to isolate the vial load from the signal generating segments from pins 12 and 3 of U-9. Each of the level vials is arranged in a bridge configuration which is balanced and connects into respective pin 5 of U-3, pin 2 of U-3, and pin 5 of U-9. Since each of these circuits is identical, the following description of one will serve to indicate the function and structure of each. Thus, level vial 130,R-141 and R-142 form an upper leg of a bridge, the lower leg of which is formed by R-150 and R-138 and the vial. R-150 serves as a small adjusting potentiometer to electronically balance the bridge when the level vial is accurately positioned. As so connected, the upper and lower legs of the bridge are examined by U-3 via resistor R-143 which is connected to the center of the vial. When the bubble in the vial is off-center, it unbalances the bridge so that the AC oscillator signal applied from pin 10 of U-3 appears either in-phase or out-of-phase at pin 5 of U-3. The output at pin 4 of U-3 thus is an AC signal, the magnitude of which is proportional to the degree of off-axis of the bubble in the level vial and the phase of the signal is either inphase or 180° out-of-phase with the input signal and, therefore, is an indication of the direction in which the X-axis vial is out of level. U-4 receives the error signal from pin 4 of U-3 and compares it to the original signal from the oscillator circuit. U-4 serves as a converter, the output of which is a DC signal the magnitude of which is again proportional to the error signal and its positiveness or negativeness value corresponds to the in-phase or out-of-phase condition of the error signal. U-9, pins 8 and 9, serve as a differential amplifier, the output of which at U-9, pin 10, is single ended. This signal is then applied to an amplifier U-7, pin 2, C-9 serves as a filter to remove high frequency components. Amplifier U-7 serves as a dual gain amplifier which in one condition where the amplified signal is less than that which would cause CR-25 and CR-26 to conduct provides relatively high gain for the nearly level condition. However, when the level vial is far from level, the diodes CR-25 and CR-26 conduct and cause the circuit to be reduced in gain to a much lower value. The resultant error correction signal is applied to both a logic circuit for controlling the laser and is also applied to the input of the motor control circuits of FIG. 16. More specifically, U-3 pin 10 provides a triangular drive waveform to the vial bridges. Zero AC output is noted at U-3 pin 4 when the bridge is balanced. That is, the ratio of vial resistances at U-3 pin 5 equals the ratio of the impedance seen looking out of U-3 pin 6. At balance, the differential output of U-4 is zero and the error signal at TPP2 is equal to $4^v$. As the vial "Tilts" away from zero, an amplitude modulated triangular waveform appears at U-3 pin 4. This signal is either in-phase or 180° out-of-phase with the drive signal at U-3 pin 10. The phase of the signal is determined by the direction of tilt (cw or ccw) and the amplitude is governed by the amount of angular departure. The demodulating circuitry (U-4), translates this AC information to a $\pm$ DC differential signal. The magnitude of the differential signal provides the information as to the amount of angular departure while the polarity indicates direction. The differential signal at U-4 is converted to a single-ended output at U-9 pin 10 which is symmetrical about $4^v$. Amplifier U-7 pin 1 provides dual gain about $4^v$. At small angular errors, the output at U-7 pin 1 is not large enough to cause CR-25 or CR-26 to conduct. Therefore, the gain of this stage is $Rf/R_{IN} = 100/47 = 2.1$. As the angular error gets larger, the output at U-7 pin 1 becomes large enough to cause the diodes to conduct and the amplifier gain becomes slightly less than unity.

Figure 16:
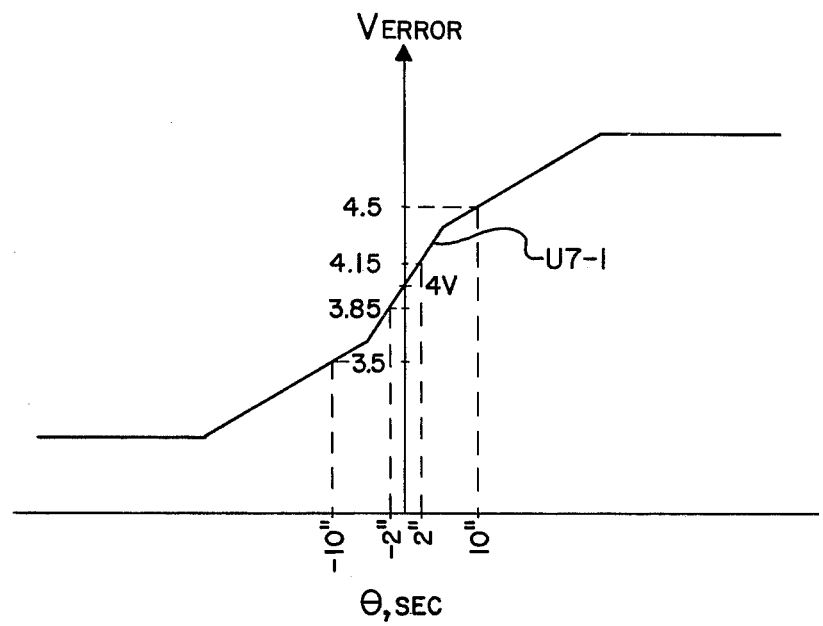
FIG. 16 is graph illustrating the error signal developed by the circuit of FIG. 14.

The output of U-7 at pin 1 is shown as a function of the error angle in FIG. 16. Thus, over the range of $-2$ seconds to $+2$ seconds the output at U-7 varies between 4.15 volts and 3.85 volts. As the error signal increases, this voltage itself varies up to 4.5 and 3.5 volts. The curve also indicates the change in the gain of the system from high gain sensitive mode when nearly level to a lower gain less sensitive mode when farther away from the level condition. This signal is applied to one input of logic circuit U-10, 368, which senses the out-of-level condition. Whenever it exceeds 10 seconds of arc, a 10 second error signal is applied from any of pins 1, 2, 13 and 14 of U-10 to the input of laser power supply control circuit consisting of Q-2 and Q-3, FIG. 15. Whenever the error signal is less than the 10-second error, the laser is turned on by driving the base of Q-3.

This in turn, turns on the series switching transistor Q-2 so that power is applied to the laser power supply. Whenever any input to U-10 exceeds the reference levels; that is to say, falls below 3.5 volts or rises above 4.5 volts, indicating the presence of an error signal greater than 10 seconds, the respective output of U-10 falls to a low value, turning off transistor Q-3 and the laser. The Y-axis leveling circuit and output signal are virtually identical to the X-axis system. As shown, the Z-axis system is also identical to the X-axis except when energized, as will now be described, the Z-axis vial uses a portion of the X-system and the same switching circuits which cause the output of the Y-axis system to be put to a precise 4 volt reference level so that the Y output exercises no control over the subsequent circuits. More specifically, there is an attitude sensing circuit, including the mercury switch 308, which connects or disconnects bias operating voltages from converters U-4, U-5 and U-6. The X- and Y-axis error sensing circuits are wired OR at the output of phase comparator U-4 and U-6. When the instrument is in horizontal to axis leveling load, the mercury switch 358 is closed. This turns on transistor Q-4 and ties the 4 volt line to thereby energize U-4 and U-5 on pins 5 of each respectively. Without this 4 volt bias signal being applied, U-4 and U-5 are inoperative. In this way, the X and y error sensing circuits are operative in the horizontal mode. In this position of the switch, Q-5 is also turned on which drops the voltage appearing at the collector, i.e., at the junction between resistor R-92 and R-93 t a low voltage, effectively turning off the bias to U-6. When the instrument is turned on its side for operation to supply a beam rotating in a vertical plane, the mercury switch opens, removing the bias signals from U-4 and U-5 but supplying a bias signal to U-6 so that the Z-axis sensing circuits are energized while the X- and Y-axis circuits are inoperative. In addition, switch U-14 is opened in the vertical mode so as to remove any Y-axis output. In addition, the voltage divider resistors R-57 and R-58 supply a precise 4 volt signal when viewed from the following circuits whenever the Y error sensing circuit is disabled.

Referring now to FIG. 15, the motor drive control circuits are shown in detail. The circuit generally indicated at 370 is a saw tooth generator of which capacitor C-51 is RC charged through resistor R-125 when the transistors Q-17 and Q-18 are in off state. The outputs which are ANDed by circuits U-2 provide a pulse width modulated signal proportional to the demand created by potentiometer P-5. Transistors Q-19, Q-20, Q-22 and Q-23 serve as a spin and grade motor driving circuit, the motor being connected through a switching circuit for spin and grade functions. Thus, whenever the potentiometer P-5 is displaced from mid-position, an output signal of suitable phase and strength will appear at the input to switching circuit 385 so that the instrument is energized into either spin or grade adjustment mode.

The X, Z error signal is applied to motor driver circuit 380 through R-25 to the pin 6 of input U-7, the output of which is taken through pin 2 of U-8 and switch U-14 to the motor driving quad Q-9, Q-10, Q-11 and Q-12. CR-4 and CR-5, together with the U-7 pins 5, 6 and 7 circuit, make up a circuit of dual gain so that whenever the input signal is greater than or less than predetermined values, the gain of this circuit is exceedingly high. This corresponds to the roughly level position. A signal comparator consisting of the circuits U-11 constantly compares the input error signal to see whether it is within the range 3.85 to 4.15 volts. Whenever it is within this range, U-11 causes switches U-14, pins 2 and 9, to switch to an open condition through switching transistors Q-7, Q-25, Q-8 and Q-26. In this way, even though the motor driver 380 nearly always has an output, it is not applied to the motor until the error exceeds a predetermined value. However, when this range is exceeded, the output of the motor driving circuit 380 will be applied to the respective drive motor by the closing of switch U-14.

Figure 17:
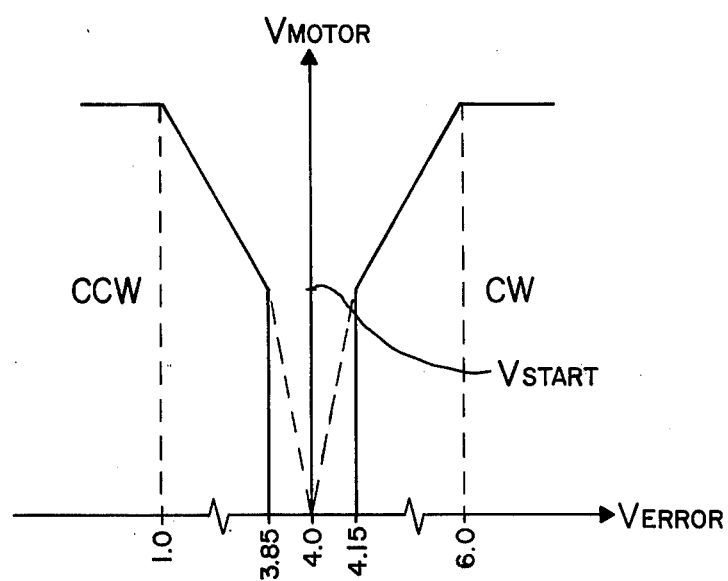
FIG. 17 is a graph illustrating the motor drive voltage as developed by the circuit of FIG. 15 in response to the error signal of FIG. 16.

FIG. 17 indicates the voltage applied to the motor as a result of the applied error signal of FIG. 16. At the threshold of the 4-volt reference, the voltage applied to the motor is zero. As soon as any error signal is received, it is processed through U-7 and U-8 to develop a step function voltage which is not applied to the motor until switch U-14 is closed. Thus, the step function output of U-8 is single valued and requires inversion to make it useful to apply to the motor. Accordingly, U-16 serves as an inverter so that whenever a voltage appears at the output of U-8, its opposite voltage appears at the output of U-16 and can be applied to the motor.

The Y-motor control circuit 382 is similar in construction and function to that of control circuit 380 and additional description is not required.

The operation and use of the invention is as follows. Where it is desired to establish a laser beam in a horizontal plane for surveying elevations, for example, housing 12 is set on the ground, or secured to a tripod, in an upright orientation as shown in FIG. 1. With a key inserted in receptacles 38 a 12 VDC power supply cable is connected into socket 34, and amber indicator lamp 36 is then turned on by the control circuit. At the same time a green indicator lamp 360 on control panel 26 is blinked on and off by the control circuit. This indicator lamp is also blinked on and off as a warning where the applied voltage drops below a pre-determined value, such as 9 volts. When power is suppled to the control circuit laser tube 164 is activated and a laser beam is generated. With switch 362 in the off position the self-leveling electronic circuit is deactivated. With switch 362 moved to the on position the self-leveling circuit is activated but the laser tube circuit is turned off and indicator light 360 is also turned off if a level condition has not been reached so that false readings cannot be taken. Light 360 will also not come on if there is a failure in any part of the control circuit. During such a failure, the control circuit commands the X- and Y-axes motors to drive the chassis about the respective X- and Y-axes to the stop positions, thereby providing a failsafe mechanism to preclude false readings being taken.

For establishing a horizontal beam plane the dials of indicator 292 should all read "0". If not, switch 318 is moved downwardly to the "Set Grade" position and this activates the grade setting control circuit. Knob 316 is then turned either clockwise or counterclockwise for controlling grade setting motor 304 to turn indicator 292 in a direction which will either subtract or add to the indicated grade so that a 0 reading is obtained. When the 0 reading is achieved the knob 316 is turned so that its fiducial mark is upright, thereby turning off the grade setting motor.

Assume that grade setting indicator 292 is set at 0 for horizontal grade but that the chassis is oriented so that the Z-axis is at an angle from a vertical plane passing through the X-axis and at an angle from a vertical plane passing through the Y-axis. In this case the X and Y level vials 130, 78 have been moved such that their level seeking bubbles are displaced from a centered position. X- and Y-axes error signals are thereby generated in the control circuit which operates the respective X- and Y-axes motors 131, 80 in the required directions to restore a level condition of the vials. The X-axis motor 131 turns drive pulley 144 which causes relative movement between idler pulleys 154, 158 and the portion of cable 148 which is affixed to tie plate 154 so that the chassis is pivoted relative to the gimbal frame about the X-axis until vial 130 is restored to its level orientation. At the same time Y-axis motor 80 drives pulley 108 to move the same relative to the portion of cable 110 which is affixed on housing tie plate 114 so that the chassis and gimbal frame are pivoted relative to the housing about the Y-axis until vial 78 is restored to its level orientation. When the chassis is thereby leveled about both X- and Y-axes, within a tolerance of ± 10 inches of arc, laser tube 164 is activated by the control circuit to reestablish the laser beam and green light 360 is turned on.

Where it is desired to point the emitted laser beam along a given path in a horizontal plane, such as toward a target plate at a remote location, switch 318 is moved up to the "Point-Spin" position. Knob 316 is then turned in either clockwise or counterclockwise directions, depending upon the desired direction in which the beam is to be moved. The control circuit responds to activate motor 238 which rotates the pentaprism reflecting head 198 which in turn sweeps the emitted beam in a horizontal plane. The degree to which the fiducial mark on knob 316 is moved from the upright position controls the rate at which the beam is rotated. When the beam reaches the desired target point the knob is turned back to its upright position. Where it is desired to continuously rotate the beam, switch 318 is kept in the "Point-Spin" position and the knob is turned in either direction. The rate of beam rotation is controllable through stepless variation, in the range of from 0 to 5 cycles per second, up to the stop limits of the knob.

To establish a graded beam plane, switch 318 is moved down to the "Set Grade" position and knob 316 is turned clockwise, where a negative grade is desired, or counterclockwise where a positive grade is desired. Grade control motor 304 is thereby activated to simultaneously operate grade setting indicator 292 and pivot arm 92 about screw 94. When the desired degree of grade is reached in the indicator, the knob is turned back so that its fiducial mark is pointed downwardly. At this point arm 92 has pivoted relative to the chassis through an angle which is equal to the selected grade angle. Y-axis vial 78 is moved with the arm and it then responds and generates an error signal which operates through the control circuit to actuate Y-axis motor 80 in a direction to pivot the chassis about the Y-axis through an angle equal to the selected grade angle such that the vial is restored to its level orientation. This establishes the orientation of Z-axis at the same selective angle from a vertical plane and thereby orients the laser beam in a plane which defines the same angle from a horizontal plane.

To establish the laser beam in a vertical plane, the housing is mounted horizontally on base plate 320 with bull's-eye level vial 42 facing up in the manner described in connection with FIG. 12. Leveling screws 231–232 are then manually adjusted until the bubble in vial 42 is centered on the bull's-eye and the control system is activated in the manner previously described. Mercury switch 358 senses the change in orientation of the housing for operating the control circuit to deactivate the X-axis level vial and Y-axis leveling system while activating the circuit incorporating Z-axis level vial 340. This level vial responds to a non-horizontal orientation of the chassis to generate an error signal which is applied by the control circuit for operating X-axis motor 131 in a direction to pivot the chassis about the X-axis in a direction which moves the Z-axis to a horizontal plane, at which point the Z-axis vial is in a level orientation. Switch 318 and knob 316 are then manipulated as previously described to rotate the beam through a plane which is automatically maintained in vertical orientation by the leveling system. As required, adjusting screw 330 on the base plate is turned to move the housing about a vertical axis and thereby adjusts the beam plane in the desired direction, within the range of travel of the adjusting screw.

From the foregoing it is apparent that there has been provided a new and improved laser beam apparatus. The laser tube, beam routing optics, and control circuit components are carried on a gimbal mounted chassis having a center pivot which allows a relatively large self-leveling range within a relatively small package or housing. The beam plane is precisely maintained in either a horizontal or selected grade angle through a two axis leveling system. A vertical plane is generated using a third level together with certain portions of the control circuits and drive motors for the horizontal and graded plane leveling system. The laser beam is adapted to be pointed in a selected direction under remote control by means of a control element which is mounted externally of the water-tight housing. A failure detection circuit is provided which turns off the laser beam and activates an indicator light in the case of electronic failure, and the laser is also turned off when an out-of-level condition is sensed to prevent misreadings. A low battery warning system is also provided. The critical components of the system including the laser tube, optics, level vial and control circuit components are isolated from external shock loads imposed on the housing through the gimbal mounting arrangement. The laser beam is emitted from a pentaprism assembly which includes an integral frame for precisely mounting beam reflection mirrors, together with a prism which is adjustably mounted for correcting any vertical beam misalignment into a horizontal plane where such misalignment can be tolerated. The rotating pentaprism is enclosed within a water-tight lighthouse assembly having flat transparent panes arranged in a manner which routes the emitted beam around corner posts of the lighthouse without introducing loss of beam signal at a remote target or beam detector. A plurality of shutters are mounted on the outside of each plane of the lighthouse for directionally controlling the arc through which a rotating beam is emitted. An arrangement is provided for precisely obtaining a fine adjustment of the platform upon which the pentaprism is rotatably mounted. An arrangement is also provided for mounting of the level vials in a manner which will accommodate for thermal expansion without introducing undesirable variables in level sensing.

The lighthouse assembly of the present invention is particularly advantageous by providing for a complete sealed container of the laser while providing for emergence of the beam without significant optical interference. In effect, the refraction phenomena which occurs at the corner joint of the windows makes it appear as if the necessary support structure, i.e., the post behind it had vanished when seen from the position of the beam thereby effectively eliminating blind spots. By utilizing the simple, readily available structural elements as disclosed herein, a strong watertight housing is provided for a laser having an output beam which rotates about an axis to define a plane in space.

In order to achieve the effect just mentioned, the window must be of sufficient thickness that the refraction effect produced is sufficiently large that the structural support, i.e., post, is eliminated. By way of example, a 0.192 inch post was eliminated by ¼ inch plate for the windows.

While the foregoing embodiments are at present considered to be preferred it is understood than numerous variations and modifications may be made therein by those skilled in the art and it is intended to cover in the appended claims all such variations and modifications as fall within the true spirit and scope of the invention.

What is claimed is:

1. In apparatus for projecting a laser beam in a plane which has a pre-determined orientation with respect to a vertical axis, the combination of a housing, a gimbal frame mounted on the housing for pivotal movement about a Y-axis, a chassis mounted on the gimbal frame for pivotal movement about an X-axis which orthogonally intersects said Y-axis, laser beam generating means carried on said chassis, optical means carried on said chassis for routing said laser beam in a path along a Z-axis which is orthogonal to said X and Y axes and thereafter projecting the beam in a plane which is orthogonal to said Z-axis, Y-axis control means including first level means mounted on the chassis for sensing the orientation thereof about said Y-axis with respect to a vertical axis, together with first operating means driveably connected between said gimbal frame and the housing for pivoting said gimbal frame about the Y-axis to a position at which the chassis is at a pre-determined orientation with respect to a vertical axis, and X-axis control means including second level means mounted on the chassis for sensing the orientation thereof about said X-axis with respect to a vertical axis, together with second operating means driveably connected between said chassis and the gimbal frame for pivoting the chassis about the X-axis to a position at which the chassis is at a pre-determined orientation with respect to a vertical axis.

2. Apparatus as in claim 1 in which the center of mass of said chassis and the elements carried thereby including said laser beam generating means, optical means, and X- and Y-axis control means lies at substantially the intersection of said X and Y axes whereby torque forces applied to said housing are not substantially applied as torque forces on said chassis.

3. Apparatus as in claim 1 in which said X-axis control means includes circuit means responding to said second level means for controlling said second operating means to move said chassis to a position at which the Z-axis lies in a vertical plane which passes through said X-axis, and said Y-axis control means includes circuit means responding to said first level means for controlling said first operating means to move said chassis to a position at which the Z-axis lies in a vertical plane which passes through said Y-axis.

4. Apparatus as in claim 1 in which said X-axis control means includes circuit means responding to said second level means for controlling said second operating means to maintain said chassis in an orientation at which the Z-axis is in a vertical plane which passes through said X-axis, and said Y-axis control means includes circuit means to move said first level means to a selected position off-set from said Z-axis in a plane orthogonal to said Y-axis, and said Y-axis control means includes circuit means responding to said first level means for controlling said first operating means to maintain said chassis in an orientation at which the Z-axis is in a plane passing through said Y-axis at a selected graded angle with respect to a vertical plane, and with said optical means projecting said beam in a graded plane, equal to said selected grade angle, from a horizontal plane.

5. Apparatus as in claim 4 in which said first level means includes a level vial together with a fluid contained within said vial which seeks a level position therein under the influence of gravity, and said Y-axis control means includes an arm mounted on said chassis for pivotal movement about an axis parallel with said Y-axis with said level vial being carried on an end of said arm, and means to pivot said arm about said parallel axis to a position at which said level vial lies at an angle, equal to said selected grade angle, with respect to said Z-axis.

6. Apparatus as in claim 1 in which said optical means includes beam reflecting means for directing said beam in a path orthogonal to said Z-axis, and means for mounting said beam reflecting means for rotation about said Z-axis whereby said beam sweeps through a plane which assumes said pre-determined orientation.

7. Apparatus as in claim 6 in which said laser beam generating means is positioned on a side of said chassis and emits said beam in a direction toward an end opposite said beam reflecting means, and said optical means includes a first beam reflector disposed in the path of said emitted beam for directing the beam in a path which intersects the Z-axis, and a second beam deflector disposed in the path of the beam from the first reflector for directing the beam along the Z-axis toward said beam reflector means.

8. Apparatus as in claim 1 in which said housing comprises a water tight enclosure which envelopes said gimbal frame, chassis, beam generator means, optical means, and X- and Y- axis control means, said enclosure including transparent window means encompassing said beam reflector means for transmitting said beam outwardly from the housing, and control means for rotating said beam reflector means to an orientation about said Z-axis whereby said beam is projected outwardly along a selected path, said control means including a control element carried on the outside of said housing and circuit means responsive to operation of said control element for activating rotation of said beam reflector means.

9. Apparatus as in claim 8 in which said transparent window means in the enclosure includes a plurality of flat transparent panes disposed in planes generally parallel with said Z-axis and with said panes being joined together at their edges to form a polygon in transverse section, together with shutter means mounted on the housing for selectively covering one or more of said panes to occlude the beam path through a sector of arc emcompassed by the panes which are thereby covered.

10. Apparatus as in claim 1 which includes an arm mounted on said chassis for movement in a plane orthogonal to the Y-axis, means for mounting said first level means on the arm, motor means driveably connected with said arm, control circuit means for actuating said motor means to move said arm and thereby said first level means to a selected angle relative to said Z-axis whereby said Y-axis control means responds to move the Z-axis to an angle from a vertical axis equal to said selected angle, and indicator means driven by said motor means conjointly upon movement of said arm for indicating the value of the angle, equal to said selected angle, at which said beam plane is defined with respect to a horizontal plane.

11. Apparatus as in claim 1 which includes Z-axis control means including third level means mounted on the chassis for sensing the orientation thereof when said housing is moved to a position at which said Z-axis is substantially horizontal, and Z-axis circuit means responsive to the housing being in said position with the Z-axis horizontal for disabling operation of said Y-axis control means and for activating said second operating means responsive to said third level means for pivoting said chassis about the X-axis to a pre-determined orientation with respect to a horizontal plane.

12. Apparatus as in claim 11 which includes a gravity sensing switch carried by said chassis, said switch being operable in a first mode when said Z-axis is vertical for enabling operation of said X- and Y-axis control means and for disabling operation of said Z-axis control means, said switch being operable in a second mode when said Z-axis is horizontal for operatively coupling said second operating means with said third level means.

13. Apparatus as in claim 1 in which said first operating means includes a motor carried by said chassis, pulley means rotatably mounted on said chassis, cable means driven by said motor and reeved about said pulley means, means fixedly attaching a portion of said cable to said housing, and means for reversibly driving said motor responsive to said first level means whereby the motor and pulley means are caused to undergo relative movement along the cable with respect to the housing for pivoting the chassis and gimbal about the Y-axis.

14. Apparatus as in claim 1 in which said second operating means includes a motor carried by said chassis, pulley means rotatably mounted on the chassis, cable means driven by said motor and reeved about said pulley means, means fixedly attaching a portion of said cable with said gimbal frame, and means for reversibly driving said motor responsive to said second level means whereby said motor and pulley means are caused to undergo relative movement along the cable with respect to the gimbal frame for pivoting the chassis about the X-axis.

15. Apparatus as in claim 1 in which said first and second operating means each include a motor carried on the chassis, a cable in driving engagement with a respective cable, with a portion of each cable being fixedly attached, respectively, to the housing and to the gimbal frame, means for reversibly operating said motors for causing pivotal movement of the respective gimbal frame and chassis about the Y and X axes, and clutch means for interconnecting at least one of said motors with a respective cable, said clutch means providing positive drive between the motor and cable under operating driving loads when the respective gimbal frame or chassis is pivoted between the extremities of pivotal movement thereof, and said clutch means disengaging said cable from the motor under driving loads which are higher than said operating loads when the respective gimbal frame or chassis reaches the extremities of the pivotal movement.

16. Apparatus for projecting a laser beam in a horizontal plane, including an elongate housing, means forming a transparent window about one end of the housing, a gimbal frame mounted within said housing for pivotal movement about a Y-axis, said gimbal frame having a central opening concentric with a Z-axis, a chassis mounted on the gimbal frame within said opening for pivotal movement about the X-axis which orthogonally intersects said Y-axis, said chassis including an elongate hollow member which extends along the Z-axis, means carried on an outer side of said hollow member for emitting a laser beam in a path generally parallel with said Z-axis, first light beam reflector means carried on one end of said chassis for reflecting said emitted beam in a first path toward said Z-axis and thereafter in a second path along said Z-axis through the hollow member, second light reflector means rotatably mounted on an opposite end of said chassis for reflecting said light beam from the second path in a plane which extends outwardly through the window in a path orthogonal to said Z-axis, a first elongate level vial mounted on said chassis in a plane orthogonal with said Y-axis, said first vial containing a fluid which seeks a level position within the vial, a second elongate level vial mounted on the chassis and extending in a plane orthogonal with said X-axis and containing a fluid which seeks a level position within the vial, control means for sensing the position and movement of the fluids within said first and second level vials and responding thereto to generate Y and X error output signals when said chassis moves about respective Y- and X-axes from a vertical orientation therewith, and means responding to said error signals for moving said chassis about said respective Y- and X-axes to restore said chassis to said vertical orientation.

17. Apparatus as in claim 16 which includes a third elongate level vial mounted on said chassis and lying in a plane which is orthogonal to said X-axis, with said third vial being aligned generally parallel with said Z-axis, said third vial containing a fluid which seeks a level position within the vial when said Z-axis is horizontal, and said control means includes first circuit means for deactivating said means for moving the chassis responsive to the Y and X error signals and second circuit means for generating Z-axis error signals when said fluid moves within said third vial responsive to movement of said Z-axis from a horizontal orientation, and means responding to said Z-axis error signals for moving said chassis in a direction to restore said Z-axis to said horizontal orientation.

18. Apparatus as in claim 1 in which said first operating means for pivoting said gimbal frame about said Y-axis includes means for developing an error signal which varies from a predetermined reference value in response to the magnitude and direction of said error, and in which said frame is misoriented about said Y-axis, means responsive to said error signal for developing a drive signal having a pre-determined polarity, drive motor means operably responsive to the drive signal for pivoting the gimbal frame, the polarity of said drive signal being such as to drive said motor in a direction to cancel said error signal, circuit means for connecting and disconnecting said motor from said drive signal means whenever said error signal has a value falling within a predetermined range of values less than that which indicates an error smaller than a predetermined value.

19. Apparatus as in claim 18 further including means for sensing whenever said error signal falls outside a second predetermined range of values, said means being responsive thereto for turning off said laser.

20. Apparatus for projecting a laser beam as in claim 1 in which said first level sensing means includes a first elongate arcuate vial mounted in a planeorthogonal to said Y-axis and containing a fluid which moves within said vial responsive to movement of said chassis about said Y-axis, a second elongate arcuate vial mounted in a plane orthogonal to said X-axis and containing a fluid which moves within said vial responsive to movement of said chassis about said X-axis, a means for mounting said first and second vials on said chassis, said mounting means including block means forming a V-shaped groove, each of which extends a precise alignment in the direction of the respective plane containing said vial, means for clamping each vial to the respective groove with the lengthwise axis thereof aligned with the lengthwise axis of the groove, means for adjustably and precisely mounting said block means on said chassis.

21. Apparatus as in claim 1 in which said housing comprises a waterproof chamber for a laser including a window structure through which the laser beam passes located at one end thereof, said window structure being formed of flat glass panes, said panes being of sufficient thickness and beveled at their edges to form a matched angle therebetween and arranged and joined together to form a box-like assembly, said bevels being formed to intersect the axis of rotation of said beam, means located outside said box-like structure for interconnecting housing elements on each side of said window structure, said interconnecting means being aligned with and in the plane of each said joint whereby refraction at the corner of said window structure and subsequent transmission through these panes make it appear as if said support structure did not exist when seen from the position of the beam.

* * * * *